United States Patent [19]

Smith et al.

[11] Patent Number: 4,854,027

[45] Date of Patent: Aug. 8, 1989

[54] MANUFACTURE OF IMPACT PRINTING RIBBON CARTRIDGE

[75] Inventors: Michael J. Smith, Bracknell; George R. W. Sully, Woking; Martin Crisp, Bracknell, all of United Kingdom

[73] Assignee: Data Recording Instrument Company Limited, Staines, England

[21] Appl. No.: 163,276

[22] Filed: Mar. 2, 1988

Related U.S. Application Data

[62] Division of Ser. No. 705,450, Feb. 25, 1985, Pat. No. 4,729,676.

[30] Foreign Application Priority Data

Mar. 1, 1984 [GB] United Kingdom ................. 8405455

[51] Int. Cl.⁴ ................................................ B23P 11/00

[52] U.S. Cl. .................................... 29/434; 400/196.1; 400/208; 400/216.1; 400/240.4

[58] Field of Search .................. 29/434; 400/208, 207, 400/196.1, 240.3, 240.4

[56] References Cited

U.S. PATENT DOCUMENTS

| | | | |
|---|---|---|---|
| 3,981,387 | 9/1976 | Gottschlich | 400/195 |
| 4,213,715 | 7/1980 | Haftmann et al. | 400/196.1 |
| 4,367,963 | 1/1983 | Daughters | 400/207 |
| 4,397,575 | 8/1983 | Aldrich | 400/211 |
| 4,407,595 | 10/1983 | Gershnow | 400/208 |
| 4,425,046 | 1/1984 | Van Horne et al. | 400/208 |
| 4,561,791 | 12/1985 | Nagashima | 400/208 |
| 4,563,100 | 1/1986 | Hamamichi | 400/208 |

*Primary Examiner*—P. W. Echols
*Assistant Examiner*—Kevin Jordan
*Attorney, Agent, or Firm*—Lee & Smith

[57] ABSTRACT

A method of manufacturing a cartridge selectively for multicolor and single color ribbons is disclosed in which the cartridge body is formed with a projection to co-act with a ribbon shift mechanism on a printer to continuously shift a single color ribbon. When the cartridge is loaded with a multi-color ribbon, the projection is broken away and a selectively operable ribbon shift cam mechanism is mounted in the cartridge.

11 Claims, 4 Drawing Sheets

MANUFACTURE OF IMPACT PRINTING RIBBON CARTRIDGE

This application is a division of U.S. Pat. application Ser. No. 705,450, filed Feb. 25, 1985, now U.S. Pat. No. 4,729,676.

BACKGROUND OF THE INVENTION

The present invention relates to impact printing apparatus such as is used for computer printout and to ribbon cartridges for use with impact printing apparatus.

A common type of impact printer used for computer printout is known as a dot matrix printer. In this type of printer the characters are formed by selective printing of a number of dots arranged in a matrix formation. The dots are printed by selectively operating a number of print wires to cause the ends of the wires to strike an inked ribbon against a paper web supported by a platen. The print wires are contained within a print head supported on a carriage which travels parallel to the width of the paper web so as to print a line of characters across the web.

For convenience in replacing the ribbon, it is commonly contained within a replaceable cartridge structure. The cartridge includes means for guiding the ribbon from a storage region in the cartridge through a printing position in which the ribbon lies between the print head and the platen and thence back to the storage region. At the printing position, the length of the ribbon lies parallel to the line of printing and the ribbon is fed to present fresh portions of the ribbon to the print head during a series of printing operations. The ribbon may be fed from a supply reel in the cartridge to a take-up reel in the cartridge, or the ribbon may be formed as an endless band engaged by pinch rolls to feed the ribbon. In the latter arrangement, the ribbon is stored as a plurality of folded loops in the storage region of the cartridge.

Often, printing is required to be in only one color, usually black, in which case the ribbon is black throughout its width. However there is a need to be able to print in any of a number of different colors selectable during the printing of a single sheet. In order to provide for such multi-color printing, the ribbon carries the different colors in inked bands extending side by side along the length of the ribbon, each band being of sufficient width to accommodate the height of a character being printed. The required color is selected by transverse movement of the ribbon, adjacent the print head, so as to interpose the band of the required color between the print head and the paper. When using a single color ribbon, it is common to provide a ribbon of greater width than the height of the characters to be printed and to obtain economy in usage of the ribbon by transverse movement of the ribbon in a series of steps whereby the full width of the ribbon is utilised.

It will be appreciated that although transverse movement of the ribbon is effected for both single and multi-color ribbons the movement for single colour ribbons is a continuous series of step movements whereas for multi-color ribbons the movement is from one band to any other band and only occurs when a change of colour is required. It is desirable that the printing apparatus should accommodate both single color and multi-colour ribbon cartridges and that the appropriate drive means is put into operation dependant upon the ribbon type contained within the cartridge.

SUMMARY OF THE INVENTION

According to one aspect of the invention a method of manufacturing print ribbon cartridges includes the steps of providing a cartridge body; loading a ribbon selected from ribbons for printing in a single color and ribbons having a plurality of differently colored bands for printing in a plurality of colors and providing selectively first means operative to co-act with a printer on which the cartridge is to be mounted to effect a first lateral motion of the ribbon when the single color ribbon is loaded in the cartridge body and second means operative to co-act with a printer on which the cartridge is to be mounted to effect a second selectively operated lateral motion of the ribbon when the multi-color ribbon is loaded in the cartridge body.

According to another aspect of the invention a print ribbon cartridge includes a cartridge body; a print ribbon having a plurality of longitudinally extending differently colored bands; guide means on the cartridge body to guide the ribbon through a printing position exterior of the cartridge; ribbon position control means arranged to co-act with means on a printer on which the cartridge is to be mounted to selectively control the position of the cartridge relating to the printer and thereby the presentation of a selected one of said colored bands at the printing position to a print head of the printer.

Preferably the ribbon position control means includes a cam and means operable to effect step-wise movement of the cam.

BRIEF DESCRIPTION OF THE DRAWINGS

Constructions of ribbon cartridge embodying the invention will now be described by way of example with reference to the drawings in which.

DESCRIPTION OF THE PREFERRED EMBODIMENTS

Figure 1:
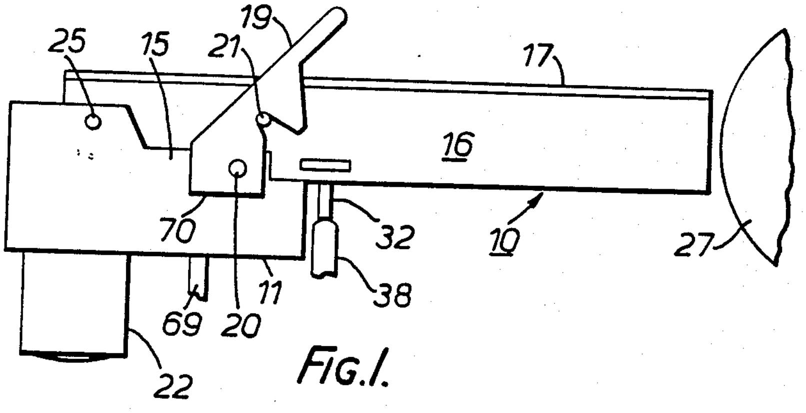
FIG. 1 is a side view of a multi-color ribbon cartridge mounted on a cartridge carrier.
Figure 2:
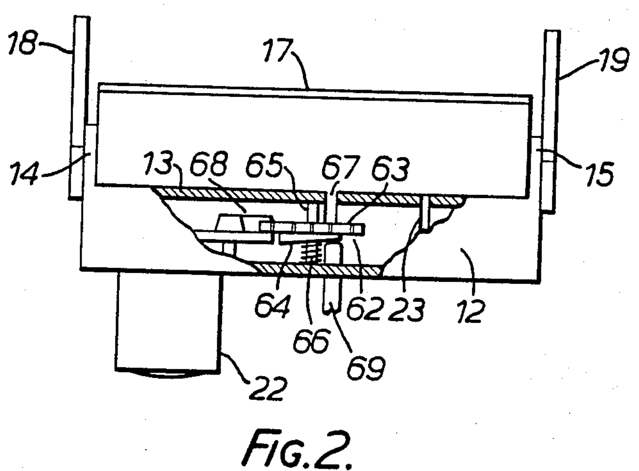
FIG. 2 is a rear view of a ribbon cartridge mounted on a cartridge carrier.

Referring first to FIGS. 1 and 2, a ribbon cartridge 10 is releasably mounted on a cartridge carrier 11. The carrier. 11 comprises a hollow gear box portion 12 having a planar upper surface 13 and two side members 14,15 extending above the surface 13. The cartridge 10 comprises a hollow body 16 closed by a lid 17. The cartridge body 16 fits snugly between the side members 14,15 of the carrier 11 and is releasably locked in position by a pair of locking levers 18,19, pivotally mounted at 20 on the side members, engaging studs 21 extending from the sides of the cartridge body. A motor 22 depends from the underside of the carrier 11 and is operable to drive, through a train of gears (not shown) housed in the gear box 12, a -ribbon feed drive shaft 23. This shaft has a projection extending above the surface 13 so as to enter the ribbon cartridge, mounted on the carrier, in driving engagement with one of a pair of pinch rolls 24 located in the cartridge (see FIG. 3).

The cartridge carrier 11 is mounted on a print carriage (not shown) by means of pivotal connections 25. It is believed to be unnecessary for the understanding of the invention to describe in detail the construction and operation of the printer because the printer may be of well known construction in which lines of printing are effected by relative motion between a print head, supported on the print carriage, and a paper web supported by a platen. However it will be appreciated that a print carriage is mounted on guides secured to the printer frame for motion parallel to a paper supporting platen. The print carriage carries a print head (indicated by broken lines 26) in close juxtaposition to a platen (indicated by broken lines 27) and the ribbon 28 contained in the cartridge 10 passes between the print head 26 and the platen 27.

Figure 3:
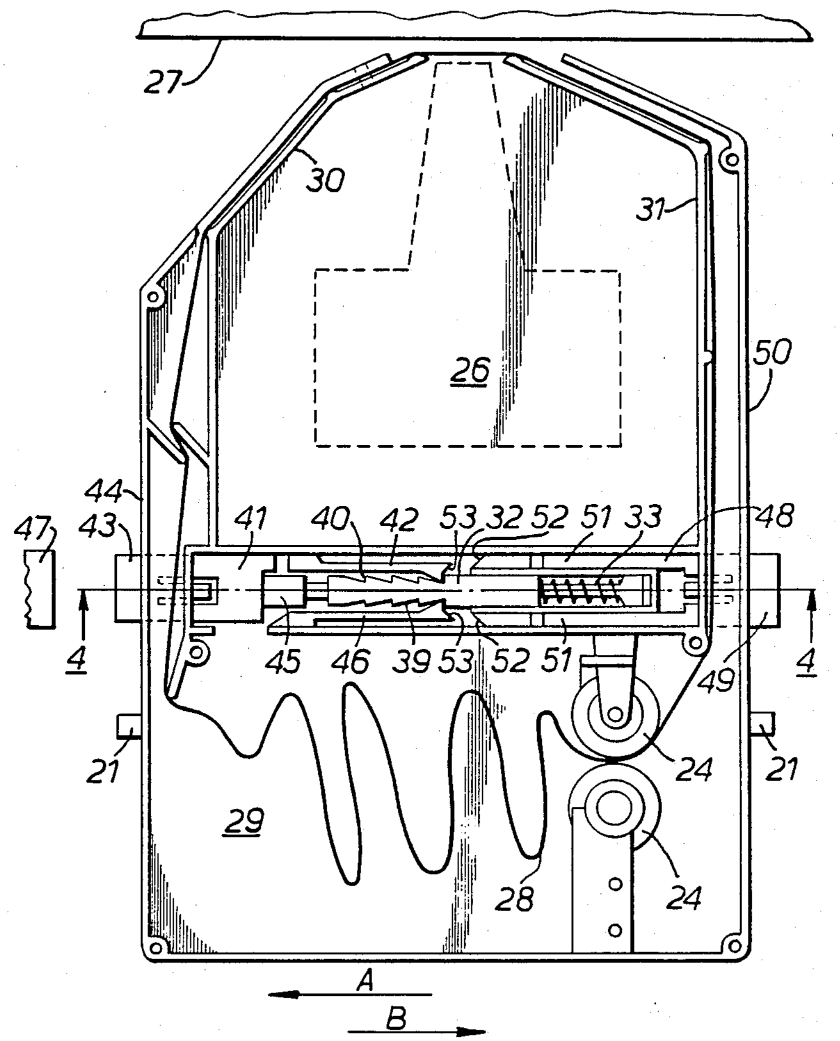
FIG. 3 is a plan view of a multi-color ribbon cartridge with its lid omitted, FIG. 4 i a sectional view on the line 4—4 of FIG. 3.
Figure 4:
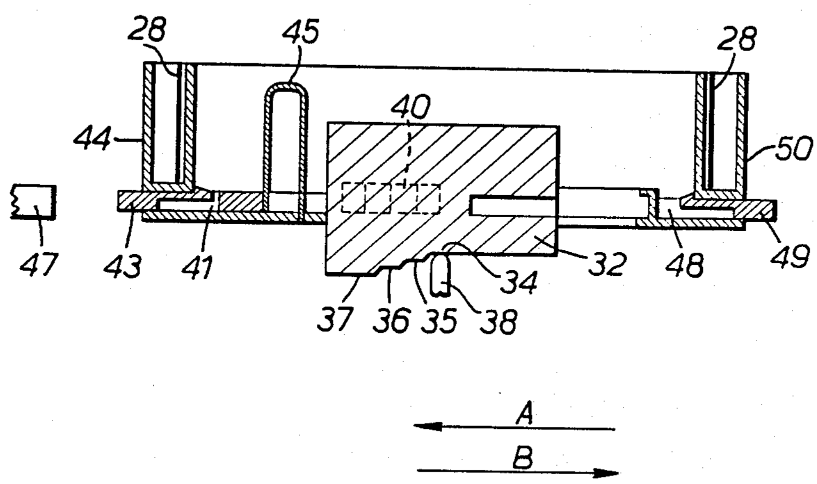
Figure 6:
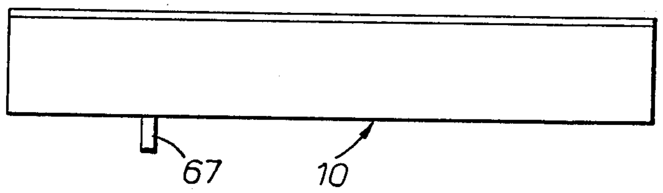
FIG. 6 is a side view of a single color ribbon cartridge.

The construction of a cartridge 10 containing a multicolor ribbon 28 will now be described in detail, firstly referring to FIGS. 3 and 4. The body 16 of the cartridge 10 contains an inked ribbon 28 which is guided along a path from a region 29, in which the ribbon is stored in closely packed folded loops through a hollow arm 30 to an exposed printing position where it extends between the print head 26 and the platen 27. From the printing position the ribbon is guided through a second hollow arm 31 to the pair of pinch rolls 24 and thence returned to the region 29. As previously mentioned, one of the pinch rolls is driven by means of the motor 22 to continuously draw fresh ribbon into the printing position. The print ribbon 28 carries a plurality of differently colored inked bands extending side by side longitudinally of the ribbon. In this specific embodiment the ribbon has four bands.

In order to select a particular color for printing, the cartridge 10, and the carrier 11 on which it is rigidly mounted, are tilted about the pivotal connections 25 relative to the print carriage. This enables the band of the required color, at the printing position adjacent the print head, to be positioned for striking by the printing mechanism. A mechanism for effecting selective tilting of the cartridge is provided on the cartridge 10. A cam plate 32 projects through a slot from the underside of the cartridge body 16 and is slidably mounted for linear movement in directions indicated by arrows A and B. A coiled spring 33 acting between the cam plate 32 and the body 16 urges the cam plate in the direction of arrow A. The lower edge of the cam plate 32 is shaped to provide a stepped surface comprising four steps 34,35,36 and 37. The cam 32 is positioned so that the steps 34,35,36 and 37 selectively can engage an abutment 38 on the print carriage. Two sets of ratchet teeth 39,40 are formed, one set on either side of the cam plate 32 within the body of the cartridge 10. A cam operating slide 41 is slidably mounted in the body 16 for movement in the same directions as the cam plate 32 and has a resilient drive pawl 42. The slide 41 has an end portion 43 which projects through a slot in the side wall 44 of the body 16. An inverted U-shaped spring 45 acts between the body 16 and the slide 41 to urge the latter in the direction of arrow A. A resilient detent pawl 46 on the body 16 engages the ratchet teeth 39 of the cam plate 32 to retain the cam plate 32 in each one of its four possible positions. The cam plate 32 is shown in a reset position in which the step 34 engages the abutment 38 and hence the ribbon, at the printing position, is at its lowermost position and the color adjacent to its upper edge is selected for printing. During a printing operation the print carriage is moved alternately in opposite directions A and B to cause the print head to traverse between opposite margins in which printing is effected. When it is desired to change the color of printing, the print carriage is moved in the direction of arrow A beyond the normal extent of travel required for printing to cause the end portion 43 of the cam operating slide 41 to engage a fixed stop 47 on the printer frame, and be pressed against the action of spring 45. Hence the slide 41 moves in the direction of arrow B relative to the cartridge body 16 and causes the drive pawl 42 to engage a tooth 40 of the cam plate and thereby move the cam plate in the direction of arrow B. The extent of movement of slide 41 is such that the cam plate moves to permit the detent pawl 46 to engage with the next tooth 39 and maintain the cam plate in this position when the print carriage returns to travel within the extent of a line of print. As a consequence the abutment 38 is engaged by the next step 35 of the cam plate and the resultant tilting of the cartridge brings the next color band into the printing position. By repeating the movement of the print carriage to cause movement of the slide 41 and the cam plate 32, the cartridge is tilted into further positions to bring the remaining color bands into an operative position. It will be appreciated that when it is desired to change from one color band to another band which is not adjacent to the first band, the slide 41 is operated a sufficient number of times by a corresponding number of movements of the print carriage without intervening printing operations.

After printing in any color other than that corresponding to the reset position of the cam plate, it may be desired to print in a previously used color and hence the cam plate 32 must be moved in the direction of arrow B. For this purpose a reset slide 48 is provided. This slide 48 is slidably mounted for movement in the same directions as the cam plate 32 and has an end portion 49 extending through a slot in the side wall 50 of the cartridge. The slide 48 has elongate pawl engaging arms 51 formed with inclined surfaces 52. Upon movement of the slide 48 in the direction of arrow A relative to the cartridge, the surfaces 52 engage similarly inclined surfaces 53 on the resilient drive pawl 42 and the resilient detent pawl 46. The inclination of the surfaces 52 and 53 is such that the pawls 42 and 46 are urged out of engagement with the ratchet teeth 39,40. The cam plate 32 is thereby released and under the action of coil spring 33, the cam 32 returns to its reset position in which step 34 engages the abutment 38. The movement of the reset slide 48, referred to above, is accomplished by moving the print carriage beyond the normal printing traversal, in the opposite direction from that used to operate slide 41, to engage a further stop on the printer frame.

Figure 5:
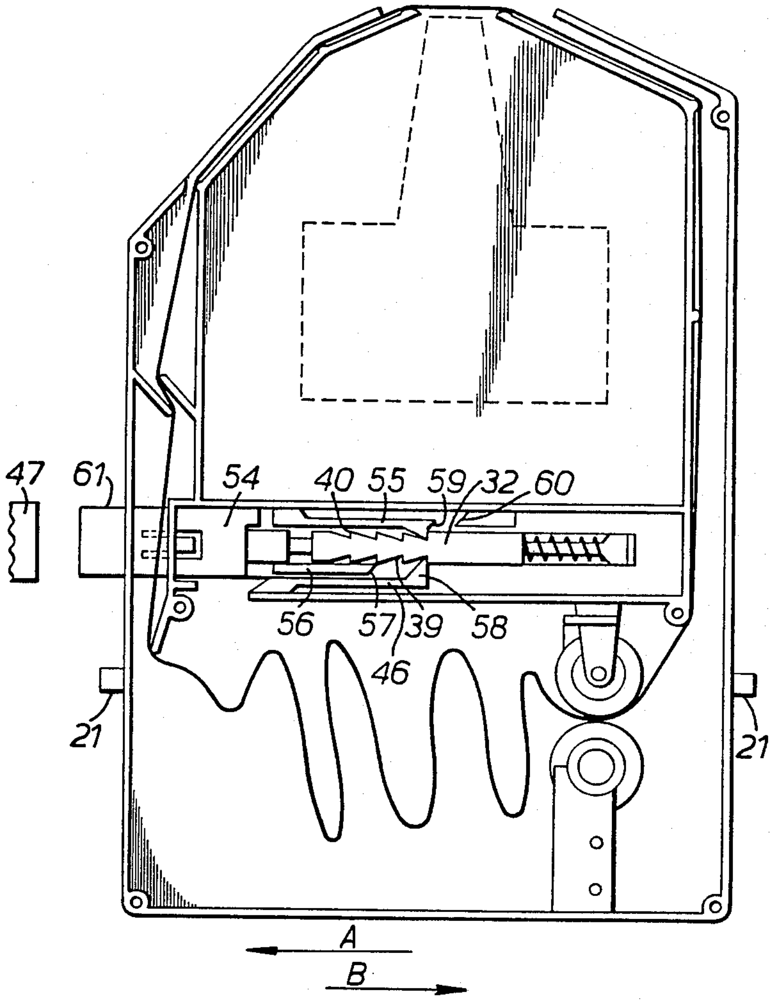
FIG. 5 is a plan view similar to FIG. 3 showing an alternative construction of color selection mechanism.

An alternative construction of color selection mechanism is shown in FIG. 5. In this construction, the reset slide is dispensed with and a single slide 54 performs both setting and resetting of the cam plate 32. The cam plate is unchanged and has ratchet teeth 39,40 on either side. However the slide 54, in addition to a resilient drive pawl 55, is provided with a detent pawl release arm 56. The end of this arm has a curved surface 57 for engagement with an inclined surface 58 on the detent pawl 56. The free end of the drive pawl 55 has an extension 59 lying below the ratchet teeth 40, and hence not engaged thereby for engagement with a curved surface 60 on the body of the cartridge.

Upon movement of the print carriage in the direction of arrow A to a first position beyond the normal printing position, the projecting portion 61 of the slide 54 engages the stop 47 and moves in the direction of arrow B relative to the cartridge 10. This first position of the print carriage is so chosen that the slide moves, within the cartridge, a distance sufficient to move the cam plate 32 through one increment of movement so that the detent pawl 46 engages with the next tooth 39 but insufficient for the arm 56 to engage the detent pawl 46 and the extension 59 of the drive pawl 55 to engage the surface 60. Each movement of the print carriage to this first position results in the cam plate 32 being moved by one increment as described in relation to the construction shown in FIGS. 3 and 4. However when the print carriage is moved further in the same direction to a second position in which the slide 54 is moved a greater extent relative to the cartridge body, the surface 57 on the pawl release arm engages the inclined surface 58 of the detent pawl and moves the latter out of engagement with the teeth 39. Also the extension 59 of the drive pawl 55 engages the curved surface 60 which causes the drive pawl to be moved out of engagement with the teeth 40. Hence the cam plate is returned to its next position by coil spring 33.

When the same cartridge body as described above is loaded with a single-color ribbon, the color selection mechanism described above is not required and hence is omitted from the cartridge. However since the cartridge accommodates a wide ribbon it is desirable to utilise the full width of the ribbon. For this purpose the cartridge and the carrier 11 on which it is mounted, needs to be tilted in a regular manner to bring all parts of the width of the ribbon into the printing position. This is conveniently accomplished by means of a cam mechanism provided in the gear box 12 of the carrier 11. The cam mechanism comprises a toothed wheel 62 having a planar upper surface 63 and an annular lower surface 64 inclined to the axis of rotation of the wheel 62. The wheel 62 is freely mounted on a fixed shaft 65 both for rotation and movement up and down along the shaft. A coil spring 66 acts on the wheel 62 urging it upwardly into an inoperative position. Cartridges loaded with a single color ribbon are provided with a peg 67 which, when the cartridge is secured to the carrier 11, enters the gear box 12 through an aperture in the upper surface 13 and presses upon the planar upper surface 63 of the toothed wheel. This causes the toothed wheel 62 to be moved down against the action of spring 66 into an operative position. In this operative position the teeth of the wheel 62 are engaged by a rotating striker 68 driven by the motor 22. Thus for each rotation of the striker the wheel 62 is rotated by one tooth position. When the wheel 62 is pressed into its operative position, the annular lower surface 64 bears against an abutment 69 on the print carriage. Due to the inclination of this surface 64 it acts as a cam and the carrier is moved about its pivotal connections 25 relative to the print carriage. Thus the motor 22 drives the ribbon feed and at the same time drives the cam surface 64 in a step-wise movement to cause the print ribbon in the printing position to be continuously stepped up and down to present all of the width of the ribbon to the print head.

It will be appreciated that with a multi-color ribbon loaded in the cartridge and with the color selection mechanism assembled therein, the ribbon shift cam mechanism provided for single color ribbons is required to be inoperative. Consequently the peg 67 is omitted from multi-color ribbon cartridges so that the wheel 62 remains in an inoperative position in which the cam surface 64 does not engage the abutment 69.

The body and lid of the cartridge preferably are moulded from plastics material. The peg 67 may be integrally moulded with the body 16 in which case it may be broken off or otherwise removed when the cartridge is loaded with multi-color ribbon. Alternatively the peg may be formed separately and secured by snap fitting in an aperture in the body 16 or by adhesive.

Thus it will be seen that the required tilting of the cartridge, either selective for multi-color or a series of steps for single color ribbon, is selected during fabrication of the cartridge in dependance upon the type of ribbon loaded in the cartridge.

In order to facilitate removal and replacement of the ribbon cartridge by an operator of the printing apparatus the locking levers 18,19 have surfaces 70, which when the levers are moved into a cartridge release position, engage the print carriage to tilt the cartridge carrier and hence the cartridge into a position in which the exposed part of the ribbon is moved up to a position clear of the print head. When the levers 18,19 are moved to a cartridge locking position, the surfaces 70 are clear of the print carriage so that tilting of the cartridge is controlled solely by the cam plate 32 in the case of multi-color ribbons and by the cam surface 64 in the case of single color ribbons.

We claim:

1. A method of manufacturing a print ribbon cartridge loaded with a length of print ribbon comprising a first step of manufacturing a cartridge body comprising walls defining a ribbon storage region, and performing selectively second and third steps;

said second step comprising forming first means on said cartridge body operative to co-act with a first ribbon shift mechanism on a printer on which the cartridge is to be mounted and loading a length of ribbon carrying a single color of ink into said ribbon storage region; and said third step comprising mounting, on said cartridge, a second ribbon shift mechanism selectively operable to co-act with abutment means on a printer on which the cartridge is to be mounted and loading a length of ribbon carrying different colored inks in a plurality of bands extending parallel to one another along the length of said ribbon into said storage space.

2. A method o manufacturing a print ribbon cartridge loaded with a length of print ribbon comprising a first step of manufacturing a cartridge body comprising walls defining a ribbon storage region and forming first means on said cartridge body operative to co-act with a first ribbon shift mechanism on a printer on which the cartridge is to be mounted; and performing selectively second and third steps; said second step comprising loading a ribbon carrying a single color of ink into said ribbon storage region; and said third step comprising mounting, on said cartridge, a second ribbon shift mechanism selectively operable to co-act with fixed abutment means on a printer on which the cartridge is to be mounted; loading a length of ribbon carrying different colored inks a plurality of bands extending parallel to one another along the length of said ribbon into said storage region and rendering said first means inoperative.

3. A method as claimed in claim 2 wherein the first step includes forming the first means as a member projecting outwardly from one of the walls of the cartridge body.

4. A method as claimed in claim 2 wherein the first step includes forming the first means as a member integral with and projecting outwardly from one of the walls of the cartridge body.

5. A method as claimed in claim 7 wherein the third step includes removal of the member from the wall of the cartridge body to render the first means inoperative.

6. A method as claimed in claim 2 wherein the first step includes manufacturing the cartridge body with further walls to define a housing for the second means and wherein the third step includes insertion of a cam mechanism comprising said second means into said housing.

7. A method as claimed in claim 2 wherein the first step includes manufacturing the cartridge body with further walls to define a housing for the second means, said further walls being apertured; and wherein the third step includes insertion of a cam member into the housing with a portion of the cam member projecting through one aperture in the further walls and insertion of a cam operating member into the housing with an end portion of the cam operating member extending from the housing through another aperture in the further walls.

8. A method as claimed in claim 7 wherein the third step includes insertion of a cam resetting member into the housing with an end portion of the resetting member extending through a further aperture in said further walls.

9. A method of manufacturing a print ribbon cartridge loaded with a length of print ribbon in which in use on a printer the cartridge is to be tilted in a continuous series of tilting movements when loaded with a ribbon carrying a single color of ink and is to be tilted selectively when the cartridge is loaded with a ribbon carrying different colored inks in a plurality of bands extending parallel to one another along the length of the ribbon the method comprising:

a first step of manufacturing a cartridge body comprising walls defining a ribbon storage region and forming first means on said cartridge body operative to co-act with a first ribbon shift mechanism on a printer on which the cartridge is to be mounted; and performing selectively second and third steps;

said second step comprising loading a ribbon carrying a single color of ink into said ribbon storage region and said third step comprising mounting, on said cartridge, a second ribbon shift mechanism selectively operable to co-act with abutment means on a printer on which the cartridge is to be mounted; loading a length of ribbon carrying different colored inks in a plurality of bands extending parallel to one another along the length of said ribbon into said storage region and rendering said first means inoperative.

10. A method as claimed in claim 9 wherein said first step includes manufacturing a cartridge body comprising a base wall and side walls extending in a first direction from the base wall defining a ribbon storage region and includes forming a member comprising the first means on aid base wall, said member projecting in a second direction opposite to said first direction; wherein said third step includes breaking said member from the base wall of the cartridge body and including a fourth step of securing a cover to the cartridge body to close the ribbon storage region.

11. A method as claimed in claim 10 wherein the ribbon is loaded into the ribbon storage region in a plurality of random folds.

* * * * *